United States Patent Office 3,277,068
Patented Oct. 4, 1966

3,277,068
PERFLUOROVINYLPHENYLETHERS AND THEIR POLYMERS
Leo A. Wall, Washington, D.C., and Walter J. Pummer, Rockville, Md., assignors to the United States of America as represented by the Secretary of the Navy
No Drawing. Filed July 31, 1962, Ser. No. 214,467
8 Claims. (Cl. 260—91.1)

The invention described herein may be manufactured and used by or for the Government of the United States of America for governmental purposes without the payment of any royalties thereon or therefor.

The present invention relates to a novel fluorinated ether and to a method of preparation thereof. In another aspect this invention relates to new and useful fluorine-containing polymer compositions ranging from relatively low molecular weight liquid polymers to high molecular weight solid polymers including greases, waxes, resins and elastomers.

Fluorine-containing polymers ranging from low molecular oils to high molecular weight plastics are of outstanding industrial importance due to their marked high thermal and chemical resistance. With the advent of missiles and rockets there has arisen a critical need for materials capable of withstanding temperatures of over 1000° F. at pressures above 1800 p.s.i. in highly oxidative atmospheres. The fluorine-containing polymers of the prior art have been found not suitable for these requirements.

Accordingly, it is an object of the present invention to provide a particular, novel and useful fluorine-containing monomer and polymer thereof.

Another object is to provide new and useful fluorine-containing ethers and to provide a process for the manufacture thereof.

Yet another object of this invention is to provide new and useful fluorine-containing polymers having excellent thermal and oxidative resistance.

Various other objects and many of the attendant advantages of this invention will be readily appreciated as the same becomes better understood by reference to the following detailed description and disclosure.

The above objects are accomplished by the preparation of trifluorovinylphenyl ether, a perfluoro ether of the formula; $C_6H_5$—O—CF=CF$_2$ and the polymerization thereof to a polymer having the above described properties.

Preparation of the trifluorovinylphenyl ether was attempted by the dehydrofluorination of tetrafluoroethylphenyl ether according to Equation I;

$$C_6H_5-O-CF_2-CF_2H \xrightarrow{-HF} C_6H_5-O-CF=CF_2$$

The yield of olefin obtained with various reagents was usually below 5% (see Table I). The dehydrofluorination agents which had some effect were: 10% platinum on charcoal pellets at 300° C.; molten sodium hydroxide alone or admixed with potassium hydroxide at 340–375° C. Refluxing in collidine with potassium hydroxide led to no dehydrofluorination. Pyrolysis at 600–700° C. resulted in cleavage to phenol and tetrafluoroethylene. This inertness to dehydrofluorination tends to emphasize the stability of these fluoroethers toward basic reagents as well as high temperatures.

TABLE I
[Dehydrofluorination of $C_6H_5$—O—CF$_2$—CF$_2$H [a]]

| Examples | Saturated Ether(g.) | Reagent(g.) | Temp. (° C.) | Yield (g.) | Olefin(g.) |
|---|---|---|---|---|---|
| 1 | 10 | 10% platinum[b] on charcoal(s). | 360 | 5 | 40% decomposition. |
| 2 | 5 | ___do___ | 300 | 3 | 0.15 g., 3.3% olefin. |
| 3 | 5 | Pyrolysis | 600 | | $C_6H_5OH$, $CF_2=CF_2$, HF. |
| 4 | 5 | KOH (5) | 150 | 4.5 | No reaction. |
| 5 | 5 | KOH (5) | 200 | 4.3 | Do. |
| 6 | 5 | {Collidine (20), KOH (5)} | 165 | 3.5 | Do. |
| 7 | 5 | NaOH (24) | 340 | 4.2 | 0.12 g., 2.7% olefin. |
| 8 | 1 | {KOH (30), NaOH (10)} | 360 | 0.5 | 0.05 g., 5.5% olefin. |

[a] Carried out in a nitrogen atmosphere.
[b] Packed iron tube.

It was then attempted to obtain the trifluorovinylphenyl ether by a direct method of preparation which comprises the reaction of an alkali metal phenoxide with tetrafluoroethylene in the presence of solvents. The alkali metal phenoxide utilized may be those available commercially such as the sodium, potassium or lithium salts either hydrated or dehydrated or may be prepared in situ in the presence of the solvent by reacting the phenol with an alkali metal dispersion. However, great care should be taken that no hydroxyl hydrogen or other available hydrogen remains in the reaction system (e.g., no free alcohol) when the tetrafluoroethylene is added, otherwise, the saturated ether, tetrafluoroethylphenyl ether, will be formed. For this same reason, any moisture, protonic solvent, or a solvent which could react with the original base or any intermediate base that is formed should not be present because of this tendency to form the saturated ether. Another byproduct formed by this reaction is 1,2-diphenoxy-1,2-difluoroethylene. This latter product presumably arises from further addition of the alkali metal phenoxide to the trifluorovinylphenyl ether. The reaction would then proceed according to the following equation:

$$C_6H_5OH + CF_2=CF_2 \xrightarrow{M}$$
$$C_6H_5O-CF=CF_2 + C_6H_5O-CF_2-CF_2H +$$
$$C_6H_5O-CF-OC_6H_5 + \text{Higher products} + MF$$

The exact conditions of the reaction depend upon the alkali metal salt of the phenol employed as well as the solvents used. Various solvents were investigated. It was attempted to obtain the olefin by the reaction of sodium phenoxide and tetrafluoroethylene (TFE) in dimethylformamide (DMF) at 80° C. but only the saturated ether was obtained (see Table II, Examples 9–10). In Example 11, it was again attempted to synthesize trifluorovinylphenyl ether with dimethylformamide under anhydrous conditions but instead the diphenoxy compound and higher condensation products were obtained. This is probably due to the fact that dimethylformamide is a good polar solvent and these phenolic salts are quite soluble in it and are available in excess to react with the trifluorovinylphenyl ether as it is formed. Tetrahydrofuran (THF) is another good polar solvent. In Example 12 reaction was attempted in DMF or THF or mixtures thereof at low temperatures and pressures but the reaction did not proceed. Higher temperatures and/or pressures were attempted in Example 13 with benzene or ethyl ether as the solvent but still no reaction occurred. But when a mixture of solvents such as in Example 14 and 15 were utilized the reaction proceeded with the formation of appreciable amounts of trifluorovinylphenyl ether. The first group of solvents comprises ethyl ether, benzene, and toluene, and the second group includes tetrahydrofuran, dioxane and dimethylformamide. These solvent pairs apparently permit sufficient amounts of the phenolic salts to be dissolved in a given time to allow the reaction to proceed but do not release such a quantity of the phenol ion to continue the reaction to the diphenoxy and other higher condensation products. The ratio of solvents is not critical and can be varied over a wide range. However, it is preferable to maintain an excess of benzene, ethyl ether or toluene so that higher yields of the olefin can be obtained.

The ratio of the other reactants can be varied over a wide range also. It is preferable to maintain an excess of the tetrafluoroethylene so that the competition between the olefin to form the diphenoxy compound and the basic compound to form the olefin will be influenced in favor of the latter reaction. Even though excess TFE (having two active sites for reaction versus only one for the trifluorovinylphenyl ether) was used, the reaction to the diphenoxy compound could only be suppressed but not eliminated. The formation of the saturated ether, tetrafluoroethylphenyl ether, probably arose from incomplete dehydration of the solvents or phenol salts. In this regard, the potassium phenoxide salt appears to be more readily dehydrated by azeotropic distillation with benzene or toluene than either the sodium or lithium salt.

with the main solution. Acidification of the salts led to the recovery of any unreacted phenol. The solvents were removed from the products by distillation at atmospheric pressure. The products were also concentrated by distillation before the separation steps.

Although the tetrafluoroethylphenyl ether boils at 13–14° C. below the saturated ether, complete separation of these compounds by fractionation was not possible. The olefin could be concentrated in a fraction boiling at 131–136° C. However, by the use of preparative vapor phase chromatography at 100° C. using a column packing composed of 20% Viton A on an 80–100 mesh celite, complete separation of the trifluorovinylphenyl ether and the saturated ether could be accomplished. Viton A is an absorbent packing manufactured by E. I. du Pont comprising a copolymer of vinylidene fluoride and hexafluoroprene. Partial separation was also effected on a 20% silicone-celite column. In both instances the olefin was eluted first. Mass spectrometer analysis obtained from the Viton A column showed the olefin to be 99.9% pure. Further confirmation of the olefinic structure of the ether was obtained from infra-red spectroscopy. The infra-red spectra showed the olefinic band of trifluorovinylphenyl ether at 1829$^{-cm}$. This band is absent in the saturated tetrafluoroethylphenyl ether. Other physical constants of the trifluorovinylphenyl ether are: Boiling point, 134–134.5° C.; refractive index ($n^{26}$), 1.4410 and freezing point, −23.5 to −22° C.

Separation of these ethers can also be effected by the two step bromination-debromination method. The fluoro-olefin reacts with bromine in carbon tetrachloride solution. The 1,2-dibromo-1,1,2-trifluoroethylphenyl ether which is formed can be then separated by vacuum distillation. The usual zinc dehalogenation regenerates the TABLE II
[Reactions of phenolic salts with TFE a]

| Examples | $C_6H_5OM$(g.) | Metal | TFE(g.) | Solvent(s) in cc. | Temp. (°C.) | Pres. (p.s.i.) | Yield | Product(s) |
|---|---|---|---|---|---|---|---|---|
| 9 | b 94 | Na | 50 | DMF (300) | 80 | 114 | 88 | $C_6H_5OCF_2$—$CF_2H$. |
| 10 | c 118 | Na | 117 | DMF (400) | 80 | 200 | 23.5 | $C_6H_5$—O—$CF_2$—$CF_2H$, mostly higher products. |
| 11 | 25 | Na | 45 | DMF (60) | 25 | 400 | 30% | $C_6H_5O$—CF=CF—O—$C_6H_5$. Multi condensation products. |
| 12 | 25 | Na | 25 | THF (250) / DMF (100) | −50 | 14 | | Little or no Reaction. |
| 13 | 110 | Na | 110 | Ethyl Ether (400) | 100 | 310 | | No Reaction. |
| 14 | 110 | Na | 110 | Benzene (400) / Dioxane (100) | 140 | 250 | 16.7 / 21.1 / 4.6 | $C_6H_5$—O—$CF_2$—$CF_2H$. / $C_6H_5$—O—CF=$CF_2$. / $C_6H_5$—O—CF=CF—O—$C_6H_5$. |
| 15 | 132 | K | 128 | Benzene (500) / THF (125) | 120 | 208 | 6.0 / 34.3 / 4.5 / 10.0 | $C_6H_5$—O—$CF_2$—$CF_2H$. / $C_6H_5$—O—CF=$CF_2$. / $C_6H_5$—O—CF=CF—$OC_6H_5$. / Higher products. | a Tetrafluoroethylene.  b Salt made in situ.  c Used hydrated salt.

The reactions to prepare the olefin were performed in silver-lined Parr bombs of 188 ml., 800 ml., or 1400 ml. capacity, under autogenous pressure. The anhydrous phenoxide salt or hydrate and solvents were placed in the bomb under an atmosphere of dry nitrogen prior to sealing. The bomb was evacuated but not degassed. Tetrafluoroethylene was then condensed into the bomb, which had been precooled in liquid nitrogen, and the bomb was sealed and placed in the rocker mechanism. The temperature at which the pressure decreased was taken as the reaction temperature. The phenolic salts were dried by azeotropic distillation from benzene followed by toluene, and finally by removal of the solvent in vacuo. The reaction solvents were dried by distillation from the reagents as follows: benzene (sodium); dimethylformamide ($P_2O_5$); dioxane (sodium); tetrahydrofuran (LiAlH$_4$) and ethyl ether (sodium).

At the completion of the reaction, excess tetrafluoroethylene was bled from the bomb; the contents were then poured into a suitable distilling container and the solvents and products were removed from the salt in vacuo. The residual salts were washed several times with benzene to remove any organic matter and the washing combined olefin from the dibromide. As a specific example of this separation technique, 25 cc. of a 10% bromine in carbon tetrachloride solution was added to a 10 g. sample of the olefin synthesis reaction containing a mixture of trifluorovinylphenyl ether and tetrafluoroethylphenyl ether until the bromine color persisted. The solution was allowed to stand for forty-eight hours at room temperature. After removal of the solvent, the residual liquid was vacuum distilled. There was obtained 2.5 g. of 1,2-dibromo-1,1,2-trifluoroethylphenyl ether, B.P. 65–67° C./1 mm.; $n_D$=1.5001. Regeneration of the trifluorovinylphenyl ether can be accomplished by the usual zinc dehalogenation method.

The trifluorovinylphenyl ether appears to be thermally stable up to 135° C., for it can be distilled at atmospheric pressure in the absence of inhibitors without any tendency to polymerize. Catalysis by peroxide, or azo-bis isobutyronitrile seems to be effective in producing radicals, as determined by the Electro-Spin Resonance Technique but no propagation occurs. Apparently, the intermediate radicals formed are relatively unreactive with each other and the monomer. Photo-initiation of the monomer by ultraviolet light in the presence or absence of the above catalysts has not led to any polymerization. However, a clear, viscous oil which had some mobility was obtained by passing boron trifluoride gas into trifluorovinylphenyl ether in propane.

A more successful polymerization of the fluorovinyl ether was obtained by gamma irradiation of the monomer in benzene at 100° C. and under high pressure. The speed of the reaction is a function of the dosage of radiation. To produce suitable reaction rates, a dosage of 0.01 to 1 megarad per hour is sufficient. A suitable source of actinic radiation is cobalt-60. The pressure is not critical and can be varied anywhere between 5 to 5000 atmospheres. The temperature of the polymerization reaction can be anywhere from 20° C. to 200° C., 100° C. being preferred. The monomer can be dissolved in any suitable solvent such as benzene, diethyl ether, dioxane, THF, DMF, etc. which may or may not be a solvent for the polymer.

The polymer obtained in this fashion was precipitated from benzene with heptane. The intrinsic viscosity of the polymer taken in benzene at 25° C. was N=0.03; its sintering point is above 100° C. Preliminary thermal stability data of the non-fractionated polymer indicates the presence of low molecular weight material as evidenced by the volatization of 60% of the sample in the 200 to 370° C. range. However, from 370 to 425° C., there was only a 10% weight loss, and only an additional 6% loss at 500° C. This data illustrates a polymer having good thermal stability at elevated temperatures, which will find multiple uses as a lubricant or gyroscopic fluid.

It should be understood that the operating conditions may be varied widely depending upon the nature of the reactants, the solvents, the proportions used and upon the results desired. The time required for carrying out the reactions may vary from several minutes to a few days also depending on the nature and concentration of the reactants and other process conditions such as temperature, pressure and catalytic initiator.

It should be understood, of course, that the foregoing disclosure relates to only preferred embodiments of the invention and that numerous modifications or alterations may be made therein without departing from the spirit and scope of the invention as set forth in the appended claims.

What is claimed it:

1. A process for the preparation of trifluorovinylphenyl ether which comprises the steps of reacting tetrafluoroethylene with an alkali metal phenoxide in an inert, anhydrous mixture of nonpolar and polar solvents, the nonpolar solvent being in excess, at a temperature of at least 120° centigrade and separating from the reaction product, trifluorovinylphenyl ether.

2. The process according to claim 1 wherein tetrafluoroethylene is present in an amount in excess of the alkali metal phenoxide.

3. The process according to claim 1 wherein the alkali metal phenoxide is formed in situ.

4. The process according to claim 1 wherein the mixture of solvents is chosen one from the first group consisting of benzene, toluene and diethyl ether and the other from the group consisting of tetrahydrofuran, dioxane and dimethylformamide.

5. The process according to claim 1 wherein the separation of the trifluorovinylphenyl ether olefinic product is effected from the remaining products by reacting the products with bromine to form 1,2-dibromo-1,1,2-trifluoroethylphenyl ether, said latter product being separated and reacted with zinc to reform said olefin.

6. The intermediate separation product of claim 5, 1,2-dibromo-1,1,2-trifluoroethylphenyl ether.

7. The process of polymerizing trifluorovinylphenyl ether olefin comprising the steps of subjecting said olefin to actinic radiation of about 0.01 to 1 megarad per hour under suitable conditions of temperature between about 20° C. and 200° C. and pressure between about 5 and 5,000 atmospheres and separating the resultant polymer.

8. The polymer produced by the process of claim 7.

References Cited by the Examiner

UNITED STATES PATENTS

| | | | |
|---|---|---|---|
| 2,799,712 | 7/1957 | Croix et al. | 260—91.1 |
| 2,917,548 | 12/1959 | Dixon | 260—614 |
| 2,928,870 | 3/1960 | Haseh | 260—614 |
| 3,101,270 | 8/1963 | Evans et al. | 204—154 |

OTHER REFERENCES

Atkinson: J. Chem. Soc. 2684 (1952).

JOSEPH L. SCHOFER, *Primary Examiner.*

NORMAN G. TORCHIN, *Examiner.*

W. G. GOODSON, M. B. KURTZMAN,
*Assistant Examiners.*